United States Patent
Ditter (10) Patent No.: US 8,999,214 B2
(45) Date of Patent: Apr. 7, 2015

(54) MULTI K-TOOL WITH ASSEMBLY

(75) Inventor: Rolf Peter Ditter, Haslach i.K. (DE)

(73) Assignee: Ditter Plastic GmbH + Co. KG, Haslach I.K. (DE)

( * ) Notice: Subject to any disclaimer, the term of this patent is extended or adjusted under 35 U.S.C. 154(b) by 795 days.

(21) Appl. No.: 13/169,825

(22) Filed: Jun. 27, 2011

(65) Prior Publication Data

US 2012/0051086 A1    Mar. 1, 2012

(30) Foreign Application Priority Data

Aug. 27, 2010   (DE) .......................... 10 2010 035 632

(51) Int. Cl.
| | |
|---|---|
| *B29C 45/14* | (2006.01) |
| *B29C 45/16* | (2006.01) |
| *B29C 45/00* | (2006.01) |
| *B29C 45/06* | (2006.01) |
| *B60Q 3/04* | (2006.01) |
| *B60Q 3/00* | (2006.01) |
| *B60K 37/06* | (2006.01) |

(52) U.S. Cl.
CPC .............. *B29C 45/162* (2013.01); *B60K 37/06* (2013.01); *B29C 45/1628* (2013.01); *B29C 45/006* (2013.01); *B29C 45/0062* (2013.01); *B29C 45/062* (2013.01); *B60Q 3/044* (2013.01)

(58) Field of Classification Search
USPC ................ 264/250, 255, 271.14, 275, 328.82
See application file for complete search history.

(56) References Cited

U.S. PATENT DOCUMENTS

| | | | | |
|---|---|---|---|---|
| 3,086,250 | A * | 4/1963 | Gits .............................. | 264/161 |
| 4,155,972 | A | 5/1979 | Hauser et al. | |
| 4,440,820 | A * | 4/1984 | Shiho et al. ................... | 428/120 |
| 5,469,758 | A * | 11/1995 | Howie, Jr. ....................... | 74/553 |
| 6,391,243 | B1 * | 5/2002 | Howie, Jr. ..................... | 264/250 |

FOREIGN PATENT DOCUMENTS

| | | |
|---|---|---|
| DE | 31 45 264 A1 | 5/1983 |
| DE | 102 26 892 A1 | 2/2003 |
| EP | 0 590 170 A1 | 4/1994 |

* cited by examiner

*Primary Examiner* — Atul P. Khare
(74) *Attorney, Agent, or Firm* — Head, Johnson & Kachigian, P.C.

(57) ABSTRACT

In order for light conductor pins (6) in dead hole channels (5) of a plastic cover not to be melted together at their entire side walls with the cover they are produced through a particular injection molding tool in the same tool as the cover and the tool slide (104) which is a component of the injection molding tool (100) is aligned in the injection molding tool (100) with the dead hole channels (5) and inserted into the dead hole channels. The front plate is integrally molded with the base component before or after the light conductor pins are inserted into the base component. When the integral molding is performed after inserting the light conductor pins (6) the integral molding is also provided e.g. at a face of the inserted light conductor pins (6).

10 Claims, 11 Drawing Sheets

MULTI K-TOOL WITH ASSEMBLY

I. FIELD OF THE INVENTION

The invention relates to plastic covers as they are used for components in motor vehicles, operator fields for machine controls and many other high volume industrial applications. Thus, a cover can be a permanently mounted insert as well as a moveable operating element like a push key, a turn regulator or a turn switch or any other element which shall cover components arranged behind it.

II. BACKGROUND OF THE INVENTION

Covers of this type have to be high quality in particular in the automotive industry in order to be usable in dash boards, thus they do not only have to be correctly sized but the surface structure and the print edges etc. also have to be made with very high quality.

Covers of this type typically do not only include a front plate providing the actual cover function but also a base element extending from the back side of the front plate in a depth direction so that the front plate and the base element together provide a three dimensional cover which has sufficient stability, can be easily handled and mounted and in which furthermore additional functions can be arranged.

For this purpose the front plate is typically made from a transparent material and is covered with a non light permeable layer on its front side wherein the non light permeable layer is only interrupted where a light permeable, in particular back lit portion shall be obtained in the cover. For this purpose the light impermeable layer is initially applied to the front plate so it covers the entire surface and is subsequently removed again in the desired portion e.g. through laser impact.

An additional function is forming pass through openings extending in depth direction of the cover, in particular of the base element of the cover, wherein the pass through openings on the front side can be closed or also left open by the front plate.

The frontal open pass through openings are used e.g. for inserting switches, operating buttons, which in turn can be again covers in the sense of the invention, or similar from the front side of the cover, while the dead or sack hole channels that are closed on the front side by the front plate have other functions and are often not only used for stabilizing the base element.

Thus e.g. portions of the cover, e.g. particular dead holes are back lit from the back side of the cover e.g. through LEDs which are arranged on a circuit board placed behind the cover in a respective position.

In particular when the a portion to be illuminated in the front plate of the cover is relatively small and the illuminating LED is relatively far behind the front plate due to the extension into the depth of the cover, e.g. 1-2 cm or more, the illumination effect on the front plate is too small.

For this purpose it is known to arrange a typically pin shaped like conductor made from plastic material in the dead hole of the cover, wherein the light conductor bridges the distance between the illuminating LED and the front plate which is light permeable in this portion in order to have a greater amount of light arrive at the front plate. Thus, the light conductor pins are made from a clear light permeable plastic material and the light conductor effect is typically comprised in that a reflection of incident light occurs at the lateral surfaces of the light conductor pin which extend in the extension direction of the light conductor pin and the light is reflected back into the light conductor.

In this context it is already known that the light conductor function of the light conductor pins is reduced when the light conductor pins are produced through filling the dead hole channel with clear plastic material through an injection molding method, thus the light conductor pins are melted together on their entire lateral surfaces together with the surrounding walls of the dead hole, thus the base element of the cover.

Melting the front face and/or the front portion of the side surfaces of the light conductor pin together in particular with the back side of the front plate, however, is harmless, since a passage of the light beam is particularly desirable at this location.

For this reason it is known to produce the light conductor pins on the other hand separately, in particular both of them through a plastic injection molding method and to subsequently insert the light conductor pins from behind into the open dead holes where they are typically interlocked through friction locking or a form locking configuration of light conductor pin and dead hole.

This, however, causes rather high logistical and assembly complexity, since the cover and the light conductor pins initially have to be produced separately possibly in the same injection molding tool, subsequently the light conductor pins have to be removed from the injection mold, stored in an intermediary manner, moved to the assembly location, correctly associated with the dead hole channels and have to be inserted into the dead hole channels. No matter whether this is performed manually or automatically the complexity is very high also for an automatic assembly particularly the investment for retrieval devices, assembly devices, transport devices, storage devices, in particular for the up to 20 light conductor pins per cover is very high.

Another problem is in this context is that covers of this type are often not planar with respect to a shape of a front side of the cover plate but have a curvature which can not only be provided in one spatial direction, but in two spatial directions as this is often the case for covers for dash boards for motor vehicles.

Since for reasons based on the injection molding technology this curvature of the front side of the front plate is typically also provided on the back side of the front plate in order to provide a even wall thickness for the front plate and the light conductor pins shall contact the back side of the front plate as precisely as possible with their front plate. This means that the light conductor pins to be used in a cover of this type, wherein the light conductor pins can be 20 or more are not identical to one another, are respectively slightly different in respect to length, curvature of the face, positioning of the interlocking elements and with respect to their longitudinal profiles.

This means that the light conductor pins are not exchangeable amongst one another with respect to the particular dead hole channels and due to the small dimensions of the light conductor pins, thus a length of 1-2 cm and a transversal extension of a few millimeters, the existing differences between the different light conductors are so small that they cannot be detected with bare eyes. This often leads to mix ups when the light conductor pins are subsequently mounted into the respective dead hole channels of the cover when the light conductor pins are not separated according to their types right from the beginning and even then mix ups can still occur.

However, when a wrong light conductor pin is pressed into a dead hole channel during assembly this is often not noticed during assembly since the physical differences between the different light conductors are very small.

This error typically only becomes apparent later when a subsequent assembly of the cover provided with the light conductors in a enveloping component is not possible or leads to damages at this location either at the cover or at the incorrectly inserted light conductor or at the receiving component enveloping the cover.

For a supplier of the cover to be integrated into a larger sub assembly this, however, causes great difficulties when he does not detect scrap due to wrongly inserted light conductor pins and delivers a faulty component of this type to his customer.

III. DESCRIPTION OF THE INVENTION a) Technical Object

Thus, it is an object of the invention to provide a method for producing covers with light conductor pins subsequently inserted therein, wherein the method reduces manufacturing complexity and to provide a tool that is suitable for this purpose and a cover that is suitable for this purpose.

b) Solution

The object is achieved through features of the claims. Advantageous embodiments can be derived from the dependent claims.

The primary object is achieved in that the base element on the one hand side and the light conductor pins on the other hand side are produced through injection molding, however, in the same molding tool and the light conductor pins are subsequently inserted through the tool or moveable components thereof into the dead hole channels of base element which is still arranged in the mold.

The base element thus extends from the front plate that is integrally molded before or after inserting the light conductor pins into the base element, wherein the front plate provides the cover function of the cover in depth direction backward and on the one hand side provides stability of the cover due to stronger three dimensionality and provides the required intermediary walls extending the depth direction between different cavities of the cover which e.g. shall be separately back lit in the later application without the light being able to reach into the adjacent cavities of the cover.

In case the front plate is only integrally molded at the base element after the light conductor pins are inserted the light conductor pins protrude with their front side far enough to the front surface of the base element in particular slightly beyond the base element, so that the front plate is also integrally molded at the front surfaces of the light conductor pins which causes optimum light transition in extension direction of the light conductor pins into the front plate.

Thus, typically the front plate is made from a transparent material and is only covered on its front side with a light impermeable layer after the cover is completely produced, it is covered e.g. through a printing or lacquering method.

In the portions in which light shall be subsequently detectable from the light conductors on the front surface of the front plate the non light permeable layer is subsequently removed again with high dimensional precision, e.g. through lasers.

The front plate, however, can be made from non light permeable material overall; however the light conductor pins made from transparent material have to completely permeate the front plate and terminate in its front surface in order to create illuminated portions therein.

Contrary to the front plate, however, the base element is always made from non light permeable material, in particular in order to provide the function of shielding against external light from one cavity of the base element into another.

In order to optimize light conduction in longitudinal direction of the light conductor pins the base element is preferably made from a light colored, preferably white plastic material, at least at the inner surfaces of the pin channels.

In case the front plate is already injection molded before the light conductor pins are inserted into the base element and thus the front plate is integrally molded at the base element, wherein in this case light conductor pins and front plate are injection molded from the same transparent material, the front face of the subsequently inserted light conductor pins only contacts the back side of the front plate or is preferably at a small distance with respect to the back side of the front plate which causes slightly reduced light transition.

The three steps of injection molding the base element, inserting the light conductor pins into the base element and injecting the front plate are performed in the same process step and thus in particular in three different sections of the tool, wherein injection molding the light conductor pins is preferably provided in the same section as injection molding the base element.

In order to use the plural sections one after another, one of the tool halves, preferably the ejector tool, is configured as a rotating disc and rotatable about its center, the axial direction.

For the case where the light conductor pins are inserted in a last step this means that     e.g. the front plate is injected in the first section;

after rotating the rotatable tool half the base element is injected in the second section of the stationary tool half at this front plate and remote there from also the light conductor pins are injected in the same injection molding step; and     the light conductor pins are brought into an aligned position with the base element in the third section of the stationary tool half and are inserted into the base element.

The process steps in the three sections certainly run simultaneously with one another, however for different covers, so that the front plate is injected this embodiment in the first section and simultaneously in the second section a base element is integrally molded at another front plate while the light conductor pins are simultaneously mounted in the third section in turn in another base element.

The movement process can be quite different in order to implement this with an injection molding tool which is typically assembled from an ejector tool and a nozzle tool.

In one solution the base element and the light conductor pins are produced in the tool separately from one another, but they are already in a correctly aligned position with respect to one another after injection molding so that the light conductor pins subsequently only have to be inserted by a tool slide into the side of the respective channels of the base element, wherein the side is open in the rear.

In this case when injecting the base element and the light conductor pins which can be performed in sequence or also simultaneously, preferably a retractable blocking element is provided which is a part of the tool and which acts as a divider between the cavities for the base element and the light conductor pins.

The other solution is that the light conductor pins after being injected are not yet in the correctly aligned position relative to the channels in the base element.

Then one of the two product components, thus the base element or the light conductor pins have to be brought into the correctly aligned position first for being inserted into one another.

This is provided through a tool component enveloping the moving part of the two product components which after opening the tool is run out of the open contact side of the respective tool half and moved (moved transversally rotated or pivoted) so that the aligned position is reached.

One option is a so-called index plate initially including all light conductor pins required for a cover which is run out of the front surface of the supporting tool half so that the index plate is freely rotatable about an axial direction and is then rotated e.g. by 180° about the axial direction, wherein the rotation axis is selected so that the light conductor pins are in an aligned position with the channels of the cover after the rotation.

When the channels are dead hole channels since the front plate was integrally molded at the base element already before inserting the light conductor pins, the insertion of the light conductor pins has to be provided from the only rear opening of the dead hole channels.

When the integral molding of the front plate is only provided after inserting the light conductor pins, inserting the light conductor pins can also be performed from the front side of the front plate into the channels which are still open then.

Preferably, however, base elements on the one hand side and the singular or plural light conductor pins on the other hand side are injection molded as the two product components to be joined in the tool so that only one of the two product components has to be moved for being inserted into the other while the other product component, e.g. the base element initially remains in one of the two tool halves after injection molding, at least until the light conductor pins are inserted therein and the cover is completely produced.

In this case this means for the base element that the open side of the channels into which the light conductor pins shall be subsequently inserted has to be freely accessible after opening the tool from the intermediary space between the tools or the other tool half.

The moveable tool component, e.g. the index plate in which the light conductor pins remain after being injected initially until they are assembled is located in particular in the tool half which is opposite to the base element. Only the orientation of the light conductor pins to be produced is different then.

In case the light conductor pins shall be inserted into the base element from its backside the light conductor pins
  are injection molded with front faces oriented into the same tool half in case they remain in the same tool half, or
  when they remain in the opposite tool half they are injection molded with front faces oriented out of the tool half.

The slide tool for mounting the light conductor pins is typically but not mandatorily located in the tool half that is opposite to the injected remaining base element, regardless in which of the two tool halves the light conductor pins have initially remained after their production.

The slide tool can be a slide tool that is movable relative to the tool halves supporting the slide tool, wherein the slide tool is hydraulically or pneumatically activated and movable in axial direction relative thereto or it can be slide components which are non-movable relative to the tool half, wherein the slide components move the aligned light conductor pins into the channels of the base element through closing the tool.

After inserting the light conductor pins into the base element, which is preferably provided by closing the tool, the front plate is possibly integrally molded with the base element and the light conductor pins in case this has not happened before the light conductor pins are inserted, and subsequently after opening the tool the finished cover is removed from the tool, in particular from the ejector tool.

Typically the light impermeable layer is applied outside of the injection molding machine to the front side of the front plate of the cover and then removed again in the required partial areas through lasers.

Another option is to bring the light conductor pins which are not aligned with the channels of the base element into the aligned position through a reversal plate which is a part of the tool and which is disposed between the ejector tool and the nozzle tool in that the reversal plate which contrary e.g. to an index plate has a cross section which has the same size as the entire cross section of ejector tool, and the nozzle tool is pivotable by 180° about an axle that is transversal to the axial direction after the ejector tool and nozzle tool are sufficiently moved apart for the pivot movement.

Depending on the selected production and movement sequence the configuration of the injection molding tool differs.

When the light conductor pins are already injection molded in a correctly aligned position relative to the channels of the base element only a slide tool is required that is axially moveable relative to a tool half besides the moveable blocking element for separating the cavities for the base element and for the light conductor.

When the light conductor pins in the tool are not injection molded so that they are aligned with the channels of the base element a moveable tool component is additionally required in which the light conductors or the base element are disposed after injection molding e.g. an index plate.

The displacement movement typically includes an axial lift off process from the contact side of the respective tool half until a transversal movement is possible with respect to the axial direction or a rotation about an axial rotation axis.

In which of the two tool halves the moveable tool component is disposed is a function of which of the two components (base element or light conductor pin) shall be moved out of the tool half in which it has remained after injection molding and displaced towards the other component.

Preferably these are the light conductor pins and they remain in the tool half opposite to the base element after injection molding and the moveable tool component is then arranged at this location, preferably in the nozzle tool.

This way no moveable lock element is required. In the simplest case an index plate that is only rotatable by 180° about an axial direction is required as the only moveable element in a tool half, wherein the index plate brings the light conductor pins injection molded in the preceding step into a aligned position relative to the channels of the base element and preferably also into an aligned position relative to a tool slide which is arranged in this position as slight protrusions that are arranged at the nozzle tool e.g. in a fixed or extensible manner and which therefore do not have to be configured moveable relative to the supporting tool half, but become effective only through closing the tool, thus moving the ejector tool and the nozzle tool relative to one another until their contact surfaces contact tightly.

Whether the light conductor pins are only fixated in a friction locking manner after insertion and/or in a form locking manner e.g. through interlocking in the receiving channels of the base element on the one hand side depends from their subsequent application and the occurring conditions like strength of jolts or similar and also from the selected manufacturing process.

For example when the front plate is only produced after inserting the light conductor pins and thus is also molded at the light conductor pins besides being molded at the base element, a friction locked fixation is sufficient until injection molding the front plate which among other things can be reached through a slide tool remaining in the inserted condition until the injection molding of the front plate is completed.

When the front plate is injection molded first, however, the selected friction locked or formed locked fixation of the light conductor pins in the base element has to be assured over the duration of the positioning.

In any case a contour that tapers in insertion direction from the forward insertable end of the light conductor pin and/or of the enveloping channel is preferred in order to facilitate insertion.

Furthermore at least one of the tool halves can additionally include a material removing tool unit, in particular a milling unit, a turning unit or a drilling unit, a laser unit and/or a joining unit through which additional production or assembly operations can still be performed in the injection molding machine.

This way a cover is produced without a separate assembly machine only through an accordingly configured injection molding machine and without manual assembly steps, wherein the cover includes a base element made from light impermeable material and a light impermeable layer on its front plate, in particular a front plate made from transparent material and in which the light conductor pins are located in respective channels of the base element without being glued or melted together along their lateral surfaces with this base element which achieves an optimum light conduction in extension direction of the light conductor pins.

c) Embodiments

Figure 1A:
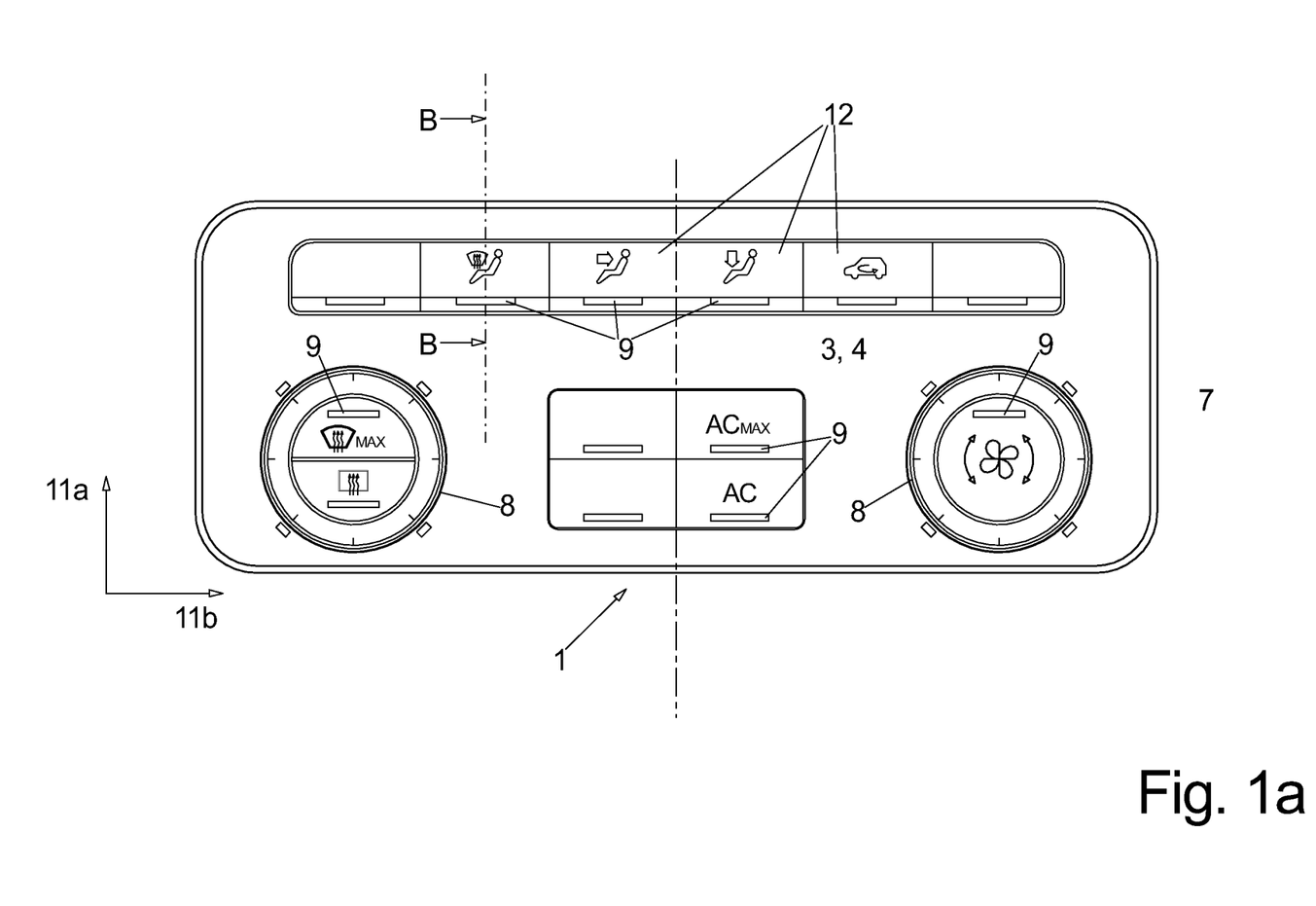
FIG. 1a illustrates a cover according to the invention.

Embodiments of the invention are subsequently described with reference to drawing figures, wherein:

FIG. 2 illustrates another variant of the embodiment according to FIG. 1a;

FIG. 1a illustrates a typical application for a cover, namely a cover 1 in a dash board 7 of a motor vehicle where in the cover includes operating—and display elements for heating—and air conditioning functions of the motor vehicle.

As illustrated in the front view of the cover 1 in FIG. 1a, the cover essentially includes two turn regulators 8 which are respectively arranged rotatable in the front plate 3 of the cover 1 and which respectively include one or two functional displays 9 that are configured to be illuminated from the rear.

In the upper portion, a row of push buttons 12 are arranged adjacent to one another, wherein functional displays 9 are individually back lit.

Typically the illumination of the respective functional display 9 means that the respective function is activated.

Typically many variants exist of a cover of this type even for a single motor vehicle model depending on which functions and configuration features a customer has selected for his vehicle.

Figure 2:
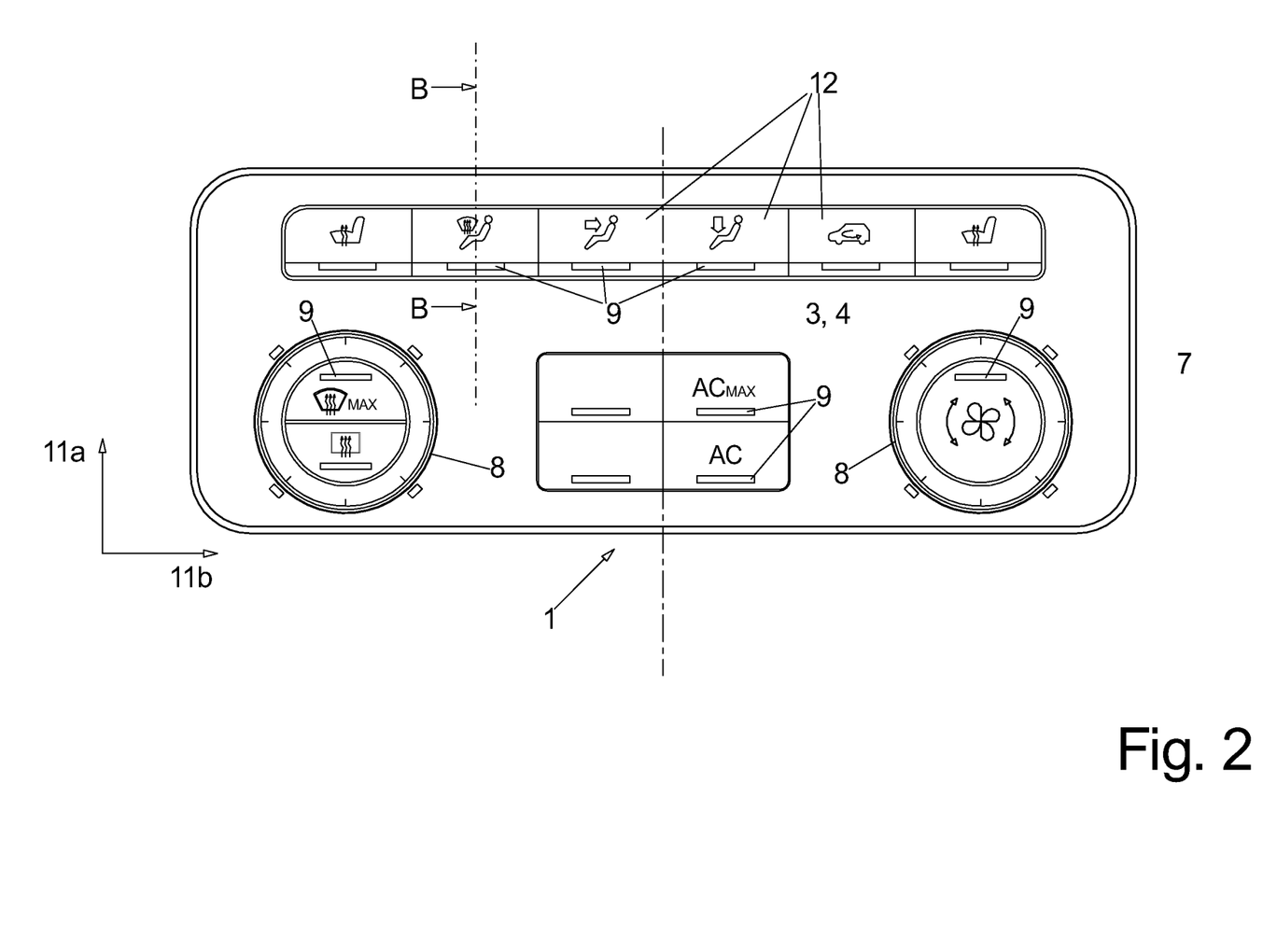

FIG. 2 illustrates a cover that is modified relative to FIG. 1a, wherein the two outer push buttons are also being used and accordingly also illuminatable functional displays are provided thereunder.

Thus, the particular cover described supra can be provided in 10 or more variants.

The cover illustrated in FIG. 1a thus includes at least 19 functional indicators which, however, does not have to be an upper limit.

It is evident from the statements made supra that the particular functional indicators 9 have to be configured to a back lit one by one and the illumination of one of the functional displays 9 must not provide light to the functional indicators arranged adjacent thereto.

In particular when functional displays are arranged closely adjacent to one another under the push buttons 12 for the seat heater, it is apparent that this can only be achieved through a shielded functional display 9.

Figure 1B:
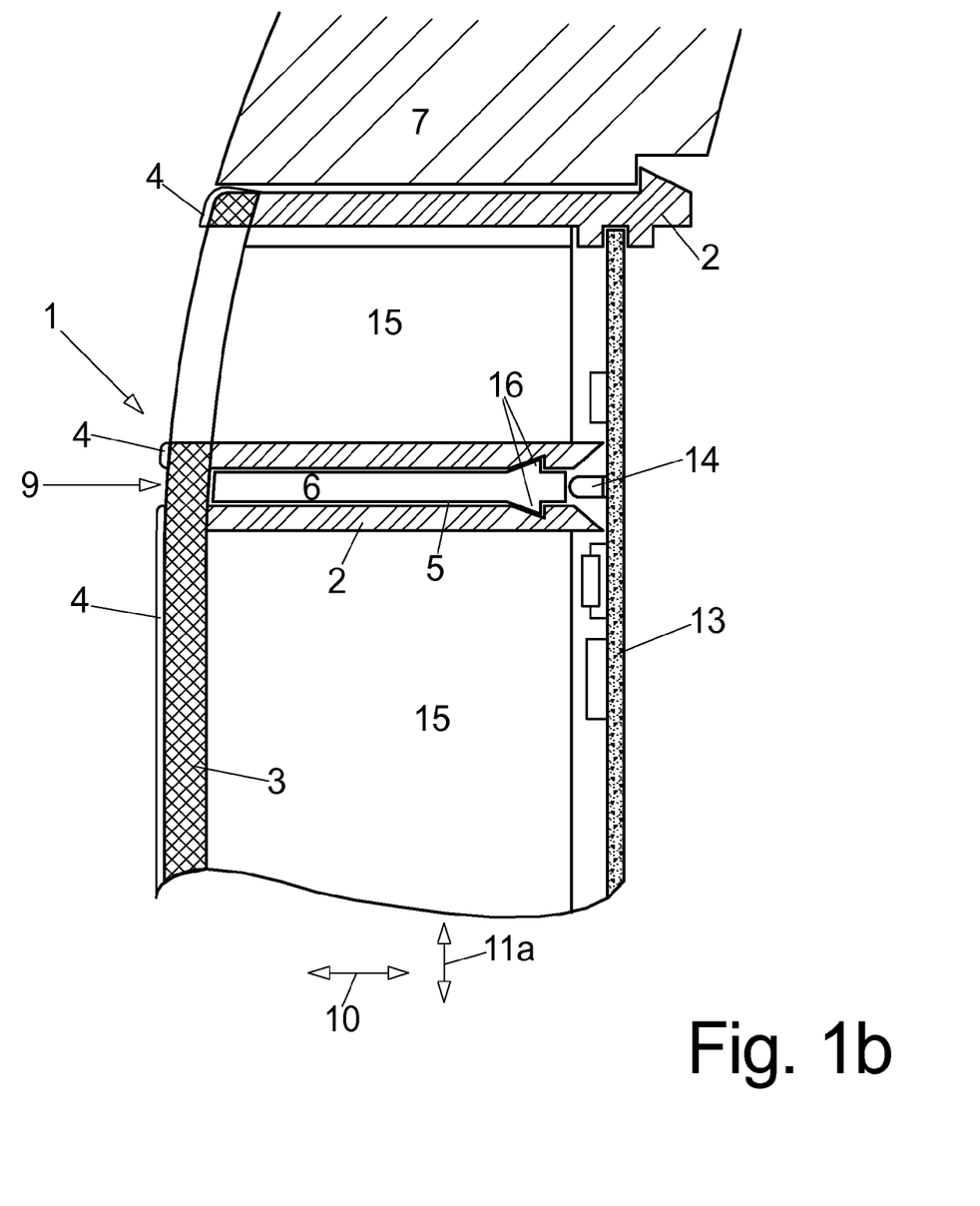
FIG. 1b-d illustrates different configurations in detail.
Figure 1C:
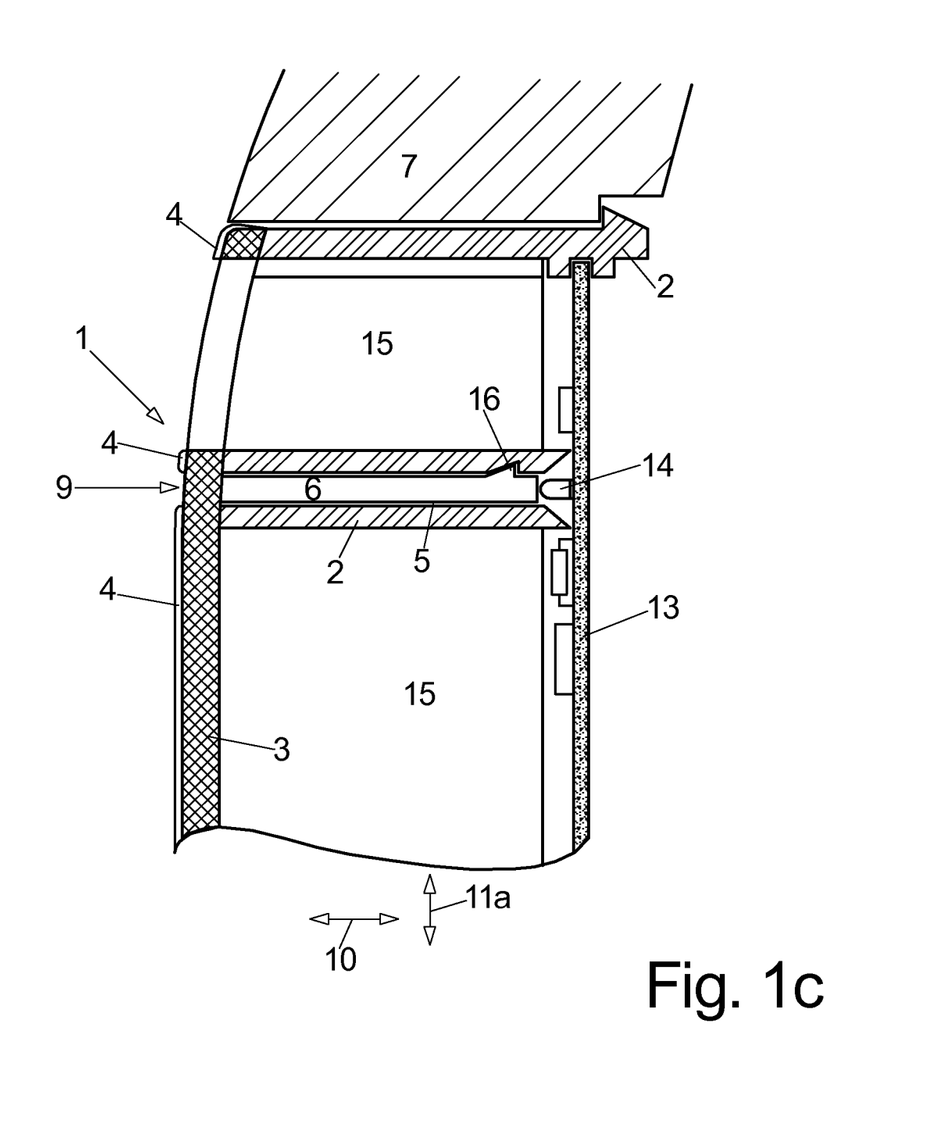
Figure 1D:
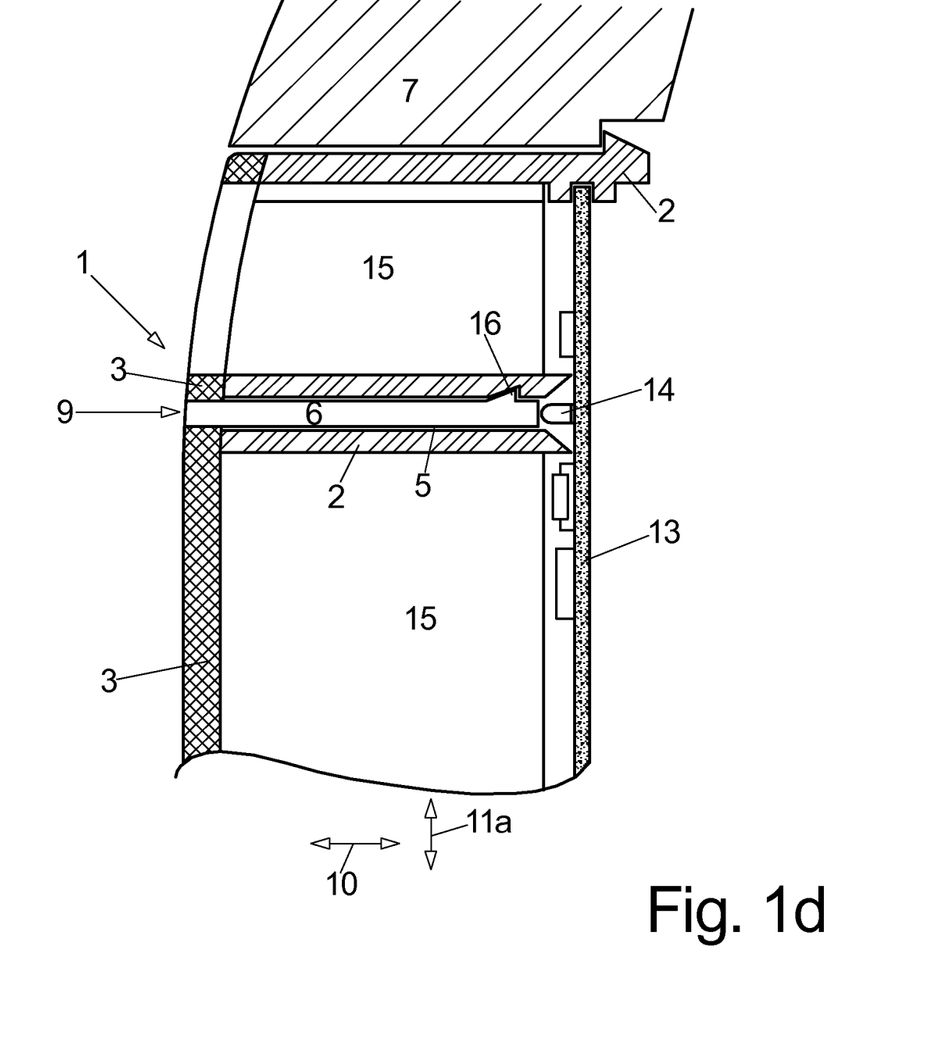

FIGS. 1b-d illustrate a sectional view along the line B-B through the upper portion of the cover 1.

This makes it evident that the cover 1, herein already in the dash board 7, is not only made from the front plate 3 visible in FIG. 1a, but also from a base element extending from the back side of the front plate into a depth direction 10 substantially including walls and braces extending in depth direction 10, wherein the walls and braces are used on the one hand side for stabilizing the front plate 3 and the other hand side for attaching in the receiving dash board 7 and also for receiving additional elements, e.g. the circuit board 13 arranged in the rear end portion of the base element 2. On this circuit board there are electrical switch elements which are in contact with operating elements like push buttons 12 and turn regulators 8 in the front plate 3 and which support among other components the light sources, typically LEDs 14 on their front side oriented towards the front plate 3, wherein one respective LED shall back light one of the functional indicators 9.

The circuit board 13 typically extends along the entire surface of the cover 1 or only over portions thereof.

FIG. 1b illustrates cover 1 as an intergrally produced component in which both components, namely the base element 2 and the front plate 3, are made from different plastic materials but are directly molded together and thus melted together.

Thus, the base element 2 is made from light permeable material, in particular in order to prevent the cavities 15 formed by the particular walls of the base element 2, e.g. the dead or sack hole channel 5 which is closed at the front end through a front plate 3 that is integral in front or through the forward open chamber 15 which is used for inserting a push button 12 that is not illustrated, no light is transmitted from one cavity 15 into an adjacent cavity, e.g. the dead or sack hole channel 5 and vice versa.

The front plate 3 is made from a light permeable, typically glass clear or matte clear plastic material. However, since only defined light permeable portions, e.g. in the form of the functional display 9 shall be provided in the front plate 3, the front plate 3 is coated with a non light permeable layer 4 after production on its front side oriented towards the user in a initially continuous manner and the coating is subsequently removed with precise contours through laser impact at locations where back lighting shall be facilitated, e.g. the surfaces of the functional indicators 9.

It is apparent from FIG. 1b that the LED 14 illuminating the functional indicator 9 is offset by a relatively large distance from the front plate 3, in practical applications e.g. by 2-3 cm.

In order for the functional display 9 to appear strongly illuminated for the user on the one hand side the walls surrounding the dead hole channel 5 are configured and coated with a light color, preferably white which causes a good reflection and thus transmission of the light to the front functional display 9.

For this purpose preferably the entire base element 2 is injection molded from a non transparent white material which prevents a separate coating of the wall of the dead hole openings 5 with paint.

In order to additionally increase the light yield on the front side of the front plate 3, thus at the functional indicator 9 that is visible to the user a light conductor pin 6 is arranged in the dead hole channel 5 wherein the light conductor pin is made from transparent preferably from glass clear plastic material and the distance between the LED 14, thus the rear end of the dead hole channel 5 and its front end, thus the back side of the front plate 3, is bridged and substantially fills the cross section of the dead hole channel 5.

Light introduced into the back side of the light conductor pin is reflected at the side walls of the light conductor pin to a higher amount through reflection or total reflection than without light conductor pin at the walls surrounding the dead hole channel 5 configured as the base element 2, wherein the walls absorb a portion of the light so that a larger amount of light arrives at the front end, the face of the light conductor pin 6.

Thus, the light conductor pin 6 is separately produced in FIG. 1b and subsequently inserted from behind into the rear open end of the dead hole channel 5 up to the back side of the front plate 3 that is already integrally molded at the base element 2 where it is e.g. interlocked in a form locking manner through the illustrated engagement lug 16 as illustrated at the top side or clamped in a friction locking manner as illustrated in the bottom side.

FIG. 1b further illustrates that the front side of the front plate 3 is cambered at least in the transversal direction 11a visible in FIG. 1b and also its back side.

Typically a curvature is also provided in the other transversal direction 11b. Both combined has the effect that the light conductor pins 6 provided in a cover 1 of this type are not identical, but almost always differ by small amounts with respect to length positioning of the engagement lug 16 or other details, so that a particularly produced light conductor pin 6 has to be inserted into each provided dead hole channel.

The transition of the light from the front face of the light conductor pin 6 into the back side of the front plate made from transparent material is the better, the closer the contact between the two elements.

The best light transmission is achieved when the front surface of the light conductor pin 6 is melted together with the front plate 3, thus its back side, as illustrated in FIG. 1c. This, however, typically requires that the front plate 3 is only integrally molded after insertion of the light conductor pins 6 into the base element 2 at these two components. A particular solution is to produce the components according to FIG. 1b and subsequently weld the components 6 and 3 together e.g. through a laser through a front plate 3, e.g. through respective focusing of the laser beam.

However, the lateral surfaces of the light conductor pin 6 shall substantially not be melted together with the surrounding walls of the base element 2 or also only glued together since this would cause good light transmission laterally into the base element.

The light transmitted in this direction and absorbed therein reduces the amount of light arriving at the functional indicator 9.

FIG. 1d, however, illustrates a solution in which the lateral surfaces of the light conductor pins 6 are melted together in their front portions with the front plate 3. In order to achieve this the light conductor pins 6 as illustrated in FIG. 1c are inserted into the base element 2, however, in this case with an overhang of the front end of the light conductor pin 6 over the base element 2 according to the thickness of the desired front plate 3 and only thereafter the light conductor pins 6 are integrally molded with the two components of the front plate 3.

In this solution the subsequently molded front plate 3 is not made from light permeable material but from non light permeable material so that hardly any light is transmitted in lateral direction and absorbed through partially melted lateral surfaces of the light conductor pins 6.

The light conductor pin 6 then leads into the front surface of the front plate 3, wherein it is a technical problem that when subsequently molding the front plate 3, the material of the front plate does not move in front of the front face of the light conductor pin 6 partially or completely covering the front face.

Since the front plate 3 is made from non light permeable material from this point onward the subsequent application of an additional light impermeable layer 4 onto the front plate of the front side 3 is not necessary.

Figure 3A:
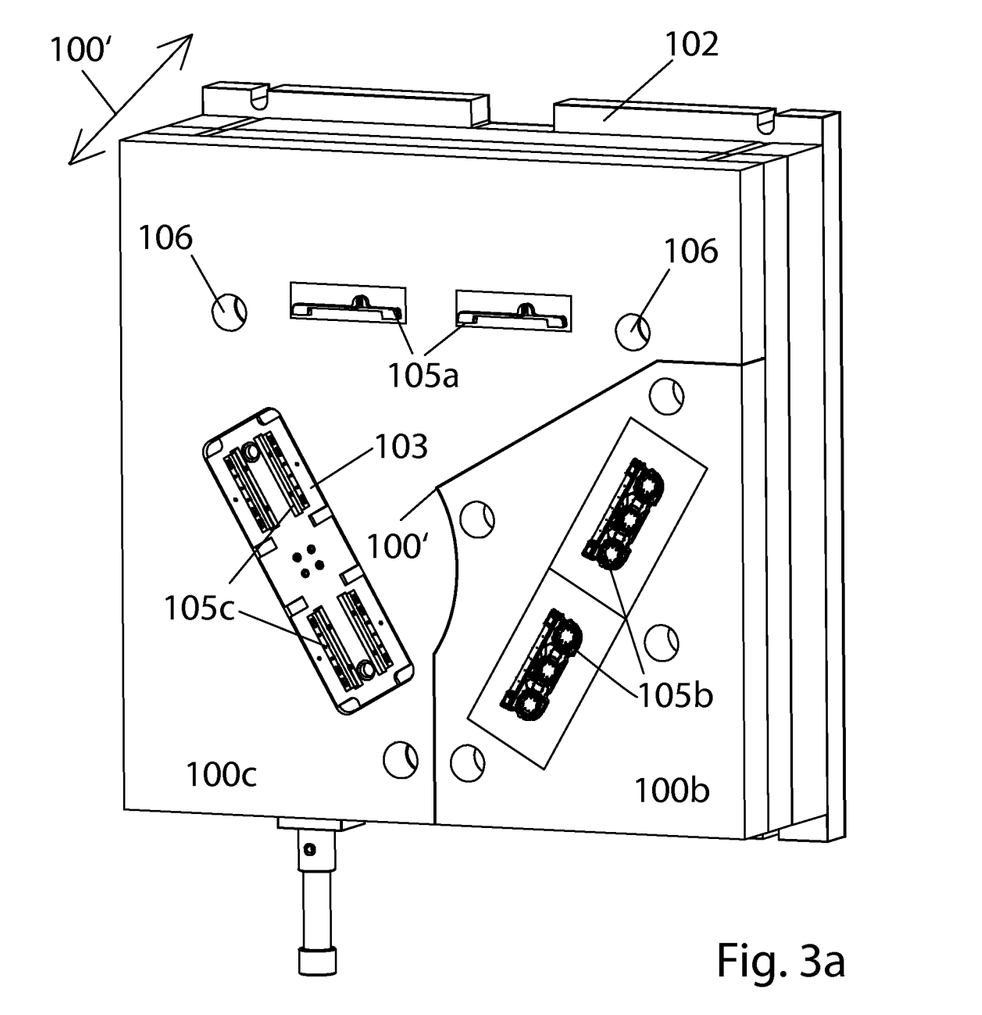
FIG. 3 illustrates the nozzle tool.
Figure 3B:
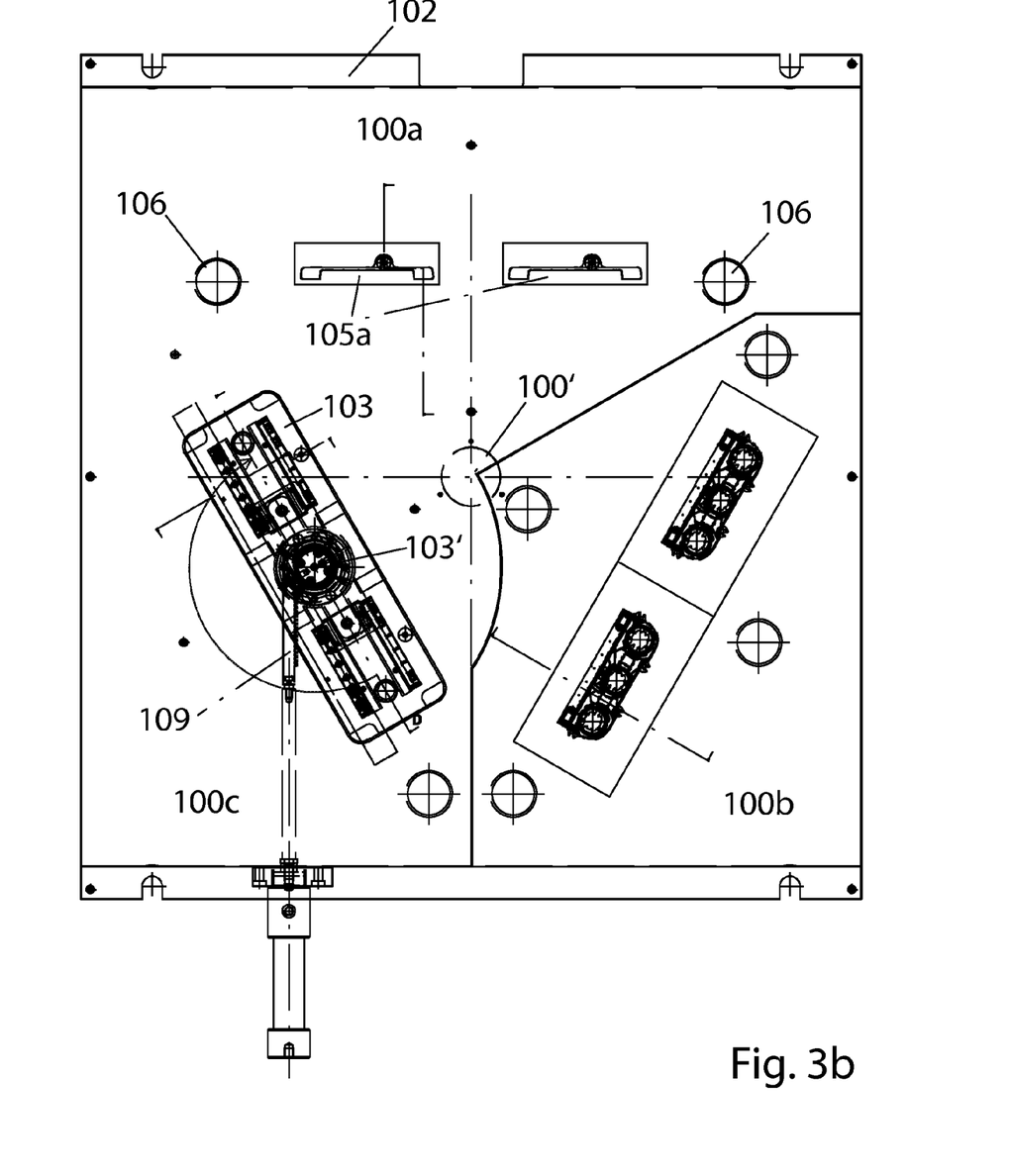
Figure 4A:
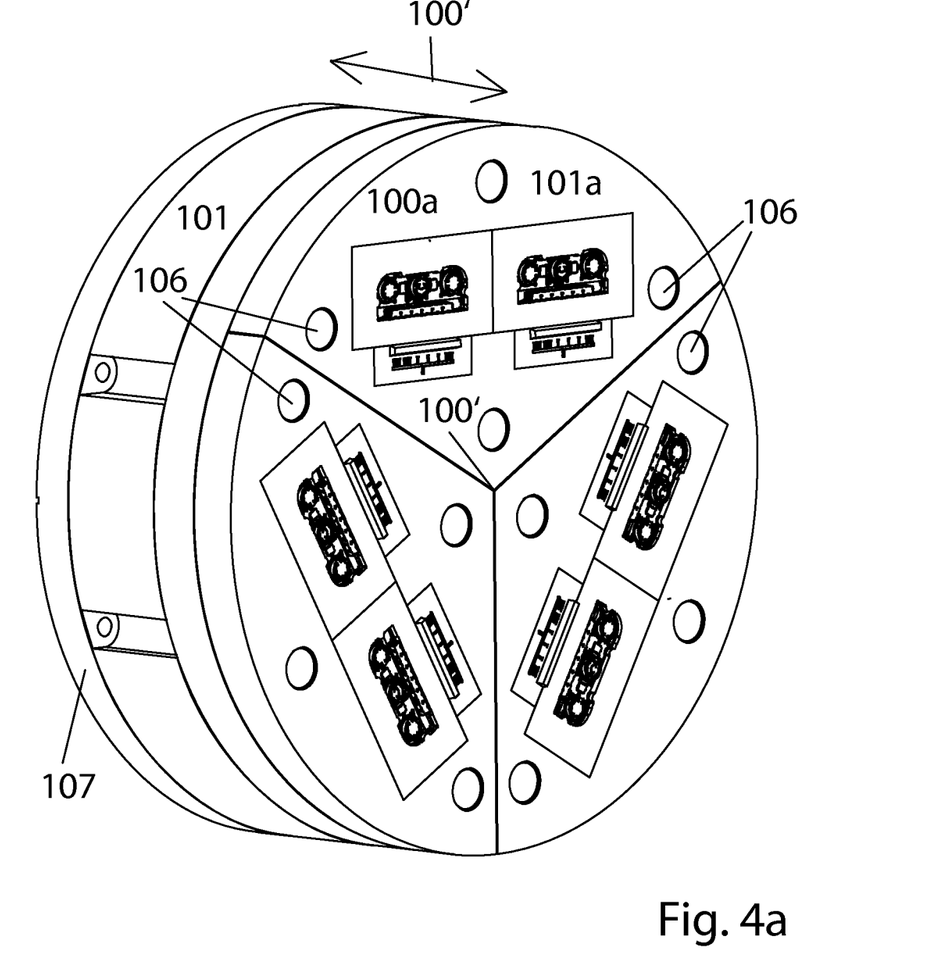
FIG. 4 illustrates the ejector tool.

FIGS. 3-5 illustrate the production of the cover 1 including its insertion with light conductor pins 6.

The cover 1, thus the base element 2 as well as the front plate 3 and also the light conductor pins 6 are produced through an injection molding method and an injection molding tool 100 which is typically made from two tool components, the ejector tool 101 and the nozzle tool 102 which are tightly pressed against one another with their contact surfaces 101a, 102a oriented against one another for injection molding the plastic component.

The contact surfaces 101a, 102a respectively include indentations, the so called cavities 105 a, b, c, which are positioned so that the cavities in the contact surfaces configured in both sides are correctly positioned relative to one another, in particular aligned correctly when the contact surfaces contact one another.

This creates a cavity that is enclosed by the injection molding tool 100 from all sides, wherein liquid plastic material is injected into the cavity through injection nozzles in the nozzle tool 102 which are not illustrated and after cooling down the part thus produced, after the ejector tool 101 and the nozzle tool 102 were moved apart and the axial direction 100', thus the perpendicular to the contact surfaces 101a, 102a, e.g. through ejectors in the ejector tool 101 that are not illustrated and fall out of the contact surface 101a or can be removed there from, wherein they have remained in the contact surface after the tool has been moved apart.

Thus by determining the separation level in the form of mutually defined contact surfaces 101a, 101b, the entire cavities and other measures determine whether after producing the ejection molding component it remains in a temporary manner until removal in the ejector tool 101 or in the nozzle tool 102.

In order for the alternative cavities 105 a, b, c of ejector tool 101 and nozzle tool 102 to join in precise alignment when closing the tool 100, guide bushings 106 are provided in these tools extending respectively in axial direction 100', wherein support rods which are not illustrated extend through the support bushings when the tool is being used.

While typically the ejector tool 101 and also nozzle tool 102 have a square planform viewed in axial direction 100' this applies in the present case only for the nozzle tool 102 while the ejector tool 101 has a circular shape or is at least applied on a circular base plate 107 at its back side.

Figure 4B:
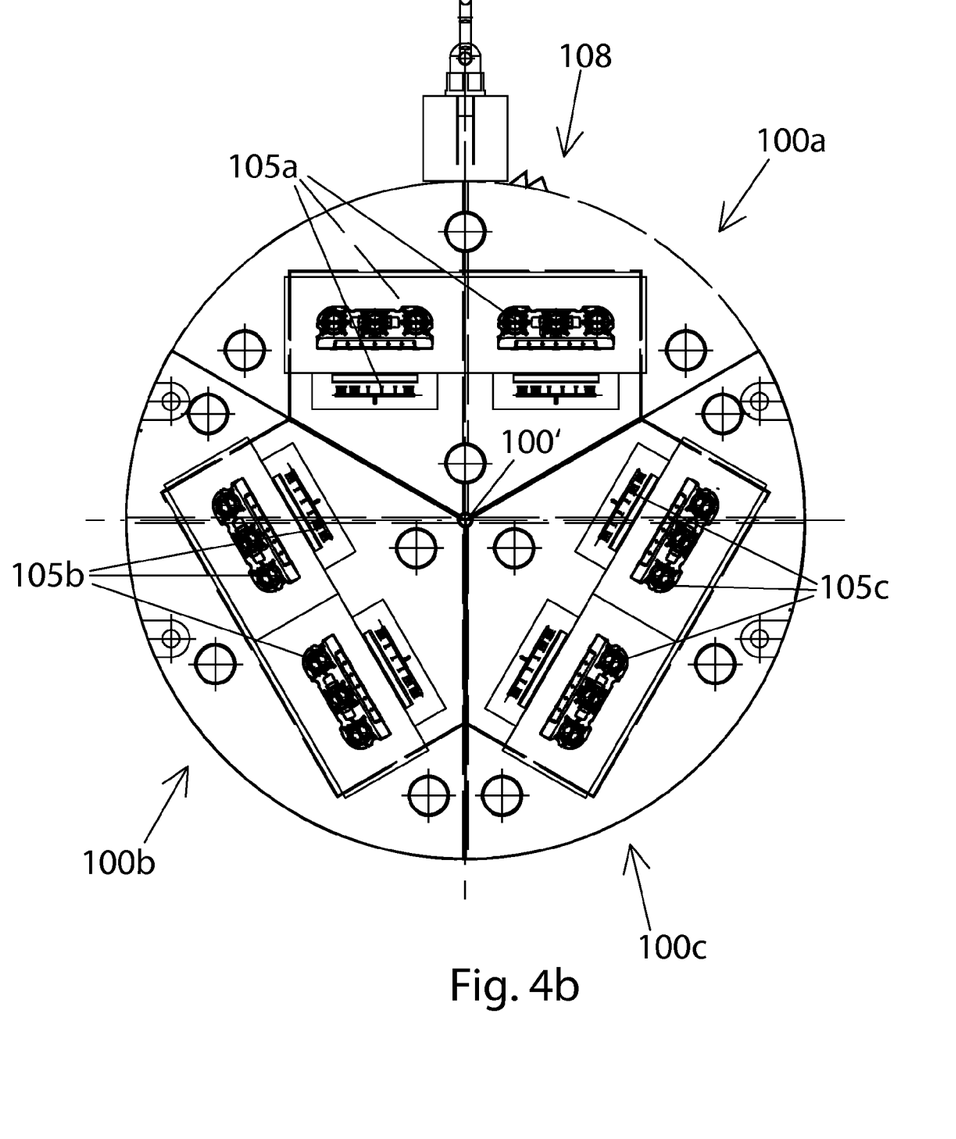

This is used to apply a teething 108 on the outer circumference of the circular ejector tool 101 or at least the circular base plate 107 as illustrated in FIG. 4b through which the ejector tool 101 can be rotated about its center axis 100' extending in axial direction 100' thus by a defined rotation angle through engagement and driving of a sprocket which is not illustrated.

As illustrated in FIG. 4 the ejector tool 101 is divided into 3 sections 100*a, b, c*, wherein the sections in the present case are also separate components and in each section cavities 105 *a, b, c* are provided in identical radial positions, wherein the sections are only rotated by 120° with respect to the center axis 100'.

Since the cover 1 is produced in this case so that it is oriented with its front side of the front plate 3 into the ejector tool 101, the contour of the front side of the front plate 3 is visible in the ejector tool 101 in all three cavities 105*a, b, c*, and adjacent there to the cavities for producing all light conductor pins 6 required for this cover 1 are visible.

Thus, the production process is configured so that the front plate 3 is injection molded in the first injection molding step in the section 100*a*. Subsequently the ejector tool 101 is rotated forward by 120° with the front plate 3 already produced therein and the base element 2 is integrally molded with the front plate 3 in section 100*b*.

In this second injection molding step a front plate 3 is certainly molded again simultaneously in the first section 100*a*.

After repeated forward rotation of the ejector tool 101 by 120° together with the cover 1 completed in section 100*b* the light conductor pins 6 are injection molded in section 100*c* in the third injection molding step besides the cover 1 that has already been completed and the light conductor pins 6 are also inserted into the cover 1 as subsequently described with reference with FIGS. 5 and 1*b*.

In this third injection molding step in turn a front plate 3 is injection molded again simultaneously in section 100*a* and a base element 2 is in turn injection molded again at the front plate 3 disposed at this location in section 100*b*.

Sections 100 *a, b, c* are visible in the nozzle tool 102, however only the section 100*c* is configured as a separate tool component that is replaceable by itself, while the other two sections 100*a* and 100*b* form a common tool component.

FIG. 3*a* illustrates that only molding channels for the front plate 3 are configured as cavities 105 *a*. In each section two respective covers 1 or parts of covers are produced adjacent to one another.

A cavity 105*b* is configured in section 100*b*, wherein the cavity also only includes molding channels for the base element 2 and optionally also includes a cavity for the rear portion of the base element 2 in depth direction 11.

FIG. 3*a* illustrates that molding channels for producing the light conductor pins 6 are provided for which respective cavities are provided in the ejector tool 101 in all 3 sections 100*a, b, c*, and therefore the cavities are not provide in sections 100*a* and 100*b* of the nozzle tool 102 and no light conductor pins are injection molded at this location.

In section 100*c*, however, the light conductor pins 6 are injection molded for this purpose the respective molding channels are visible in the contact surface 102*a* of the nozzle tool 102.

As illustrated in FIG. 3*a* the molding channels for the light conductor pins 6 are configured recessed in section 100*c*, thus the cavities 105*c* in a tool component 103, a so called index plate that is separate from the remaining ejector tool 102.

This index plate 103 as illustrated in an enlargement in FIG. 5 can be axially moved out of the front surface 102*a* of the nozzle tool 102 after the ejector tool 101 and the nozzle tool 102 are moved apart and can be pivoted about its center axis 103' by 180°.

As evident in FIG. 3*b* this is performed through a gear that is centrally arranged about the center axis 103, wherein the gear can be rotated by exactly 180° through tangential movement of a gear rack 109 which is arranged parallel to the front surface 102*a* and the nozzle tool 102 and can be lowered again in this rotated position into the front side of the nozzle tool 102.

Thus preferably a forward and back rotation of the index plate 103 can be provided by 180° through the gear rack 109 but an ongoing rotation by more than 180° cannot be provided.

In order for light conductor pins 6 to be moldable in each of the two rotation positions of the index plate 3 the index plate 3 preferably includes two respective cavities 105*c* on both sides of its longitudinal center for the light conductor pins 6 and thus a total of four cavities of which only two of the four cavities are injected with plastic material in section 102*c* in the third injection molding step, wherein the cavities are arranged outside of the cover thus are not aligned with the cover.

This prevents an additional step of lifting the index plate 103 off and rotating it back before renewed production of light conductor pins 6.

The rotatability of the index plate 103 is used for moving the light conductor pins 6 injection molded remote from the base element in this section, namely according to FIGS. 3*c* and 5 in the two cavities 105*c* arranged closer to the center axis 100' to an opposite side through pivoting the index plate to the opposite side with respect to the center axis 103', wherein the light conductor pins are in precise alignment with the cover or only the base element 2 and the dead hole channels 5 for the light conductor pins configured therein wherein the cover 1 is arranged in the opposite ejector tool 101.

In this position as illustrated in FIG. 5 in an axial sectional view the light conductor pins 6 are inserted all together through a single tool slide 104 which is also arranged in the nozzle tool 102 and is hydraulically extendable in axial direction relative to the nozzle tool 102 in a direction towards the ejector tool 101 out of the index plate 103 into the dead hole channels 5 and thus the cover 1 or the base element 2 which are arranged in the ejector tool 101 into the final assembly position.

For this purpose before extending the tool slide 104 the ejector tool 101 and the nozzle tool 102 are moved against one another again, preferably until their contact surfaces 101*a* and 102*a* contact one another as illustrated in FIG. 5.

After the tool slide 104 is pulled back and the ejector tool 101 and the nozzle tool 102 are moved apart the cover 1 with inserted light conductor pins 6 can be removed from the section 100*c* of the ejector tool 101.

FIG. 5, however, illustrates a different case wherein namely only the base element 2 is produced through injection molding and in whose dead holes the light conductor pins 6 are inserted through the tool slide 104 and thus from the front side of the dead holes which are still open then, wherein the front side is only integrally molded at the front plate 3 after the light conductor pins 6 are inserted and thus the front side is also integrally molded at the front face of the light conductor pins 6.

Accordingly the base element already injection molded in the ejector tool 101 is oriented with its front side to the contact surface 101*a* or 102*a* between the two tool halves.

Figure 5A:
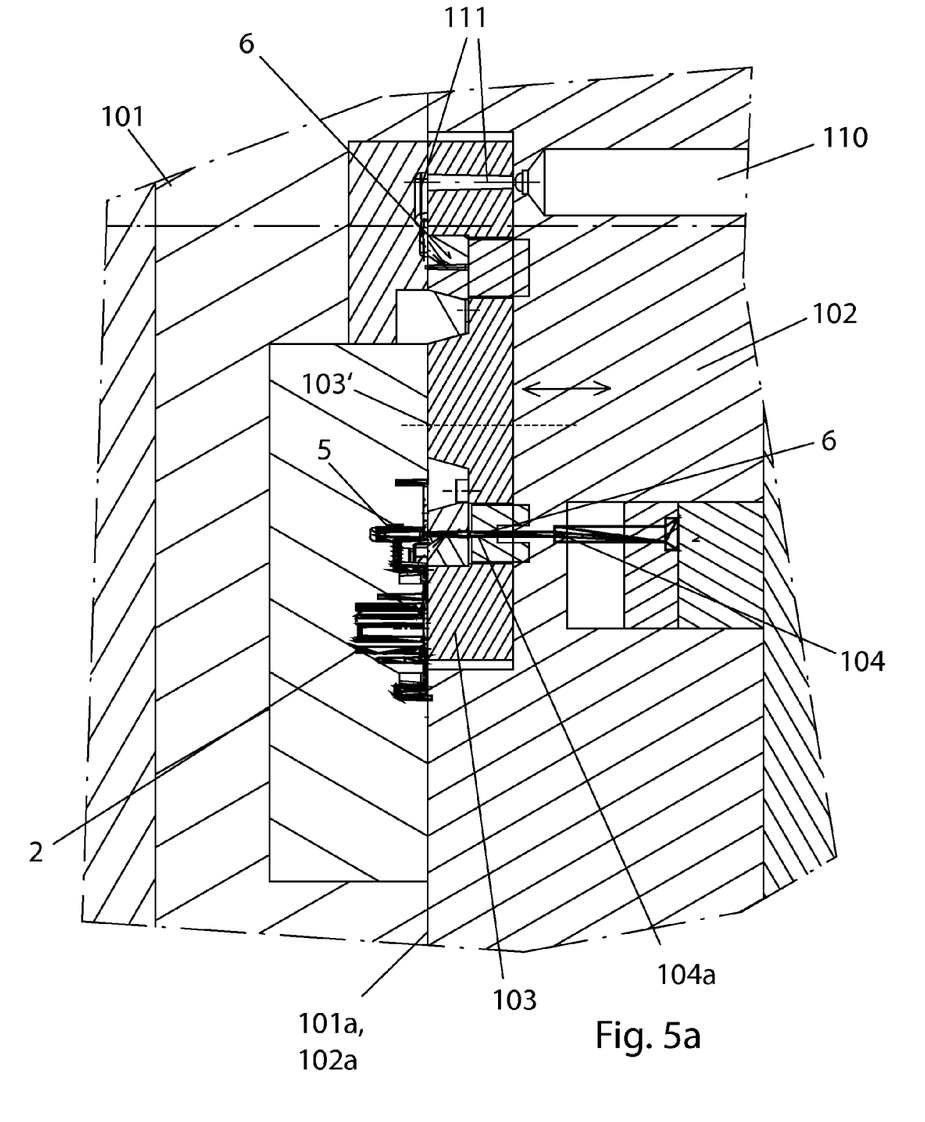
FIG. 5 illustrates the insertion process of the light conductor pins.

FIG. 5*a* illustrates the tool slide 104 in its pulled back position. The light conductor pins 6 are still arranged in the index plate 103.

Figure 5B:
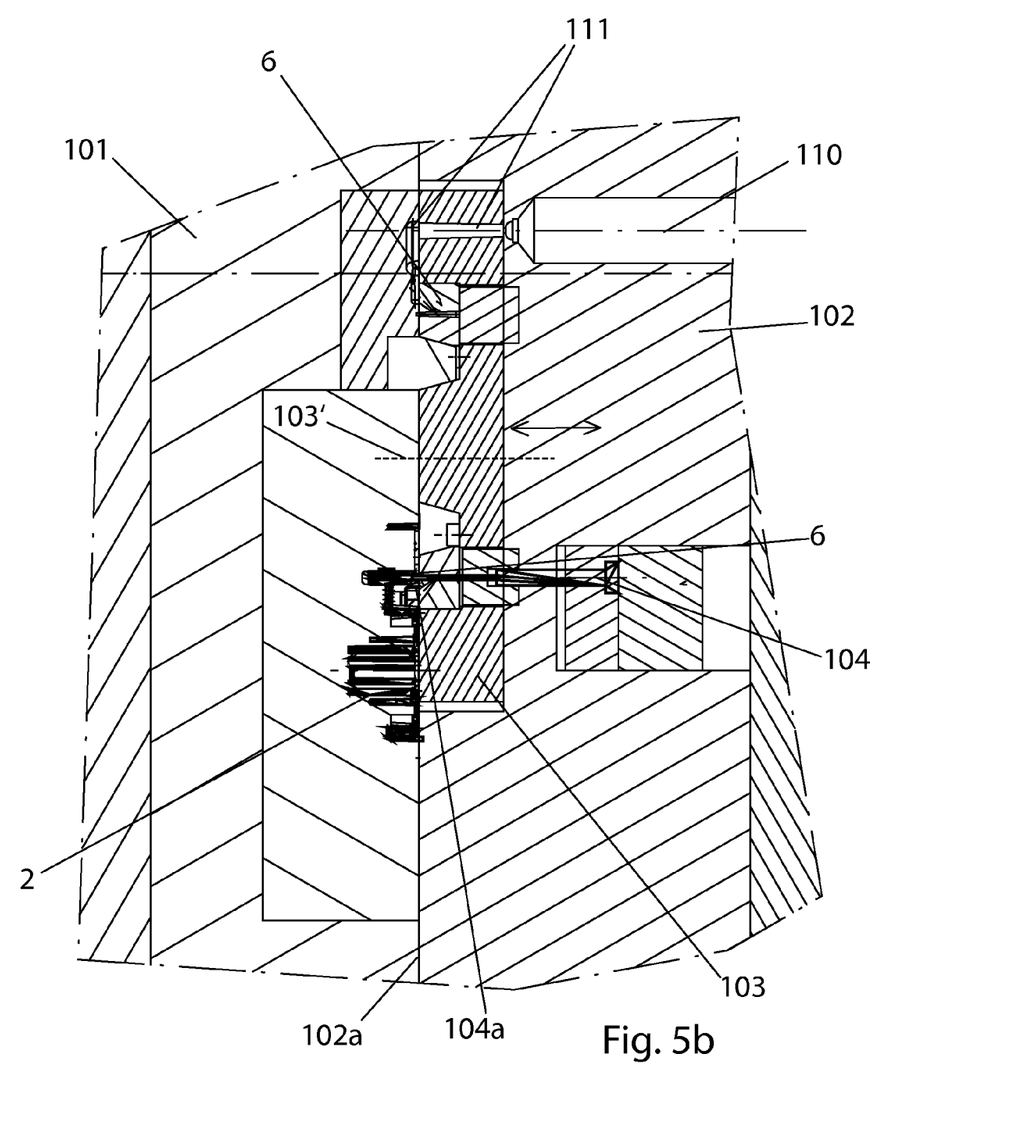

In FIG. 5b the tool slide 4 is arranged in the forward position and the light conductors 6 are already arranged in the dead hole 5 provided for this purpose.

Simultaneously the index plate 103 can be molded with a set of light conductor pins 6 as visible in the upper half of the index plate 103.

From the injection nozzle 17 in the nozzle tool 102 the liquid plastic material moves into the cavity 105c through a connection channel 111, wherein the connection channel extends through the index plate 3 and extends along the contact surface of the ejector tool 101 radially with respect to the longitudinal center axis 100' in inward direction to the cavity 105c which is arranged in the index plate 103.

REFERENCE NUMERALS AND DESIGNATIONS 1 cover
2 base element
3 front plate
4 Non light permeable layer
5 pin channel
6 light conductor pin
7 dash board
8 turn regulator
9 functional indicator
10 depth direction
11 a, b transversal direction
12 push button
13 circuit board
14 LED
15 cavity
16 engagement lug
100 injection molding tool
100' axial direction center axis
100 a, b, c section
101 ejector tool
101 a contact surface
102 nozzle tool
102 a contact surface
103 tool component, index plate
103' center axis
104 tool slide
105 a, b, c cavity
106 support bushing
107 base plate
108 teething
109 gear rack
110 injection nozzle
111 connecting channel

The invention claimed is:

1. A method for producing a cover from injection molded plastic material, the cover comprising:
an integrally connected base element and front plate;
at least one base element dead hole channel each open on a backside of the base element; and
at least one light conductor pin made from light permeable plastic material, each of the at least one light conductor pin arranged in a respective dead hole channel,
wherein the method comprises the following steps:
injection molding the base element in an injection molding tool, the injection molded base element remaining in the injection molding tool;
injection molding light conductor pins in an index plate of the injection molding tool remote from the remaining base element;
arranging each injection molded pin so as to align with a respective dead hole channel of the remaining base element by opening the injection molding tool and moving each pin out of the injection molding tool and about an axial direction using the index plate;
closing the injection molding tool and axially inserting each aligned pin into its respective dead hole channel using an axially movable tool slide;
directly integrally molding the front plate onto the remaining base element in the injection molding tool before or after said arranging of the light conductor pins; and
opening the injection molding tool and removing the cover.

2. The method of claim 1, wherein:
the injection molding tool comprises a rotatable ejector tool, and
the base element, front plate, light conductor pins are injection molded in a distinct base element section, front plate section, and light conductor pin section respectively of the ejector tool.

3. The method of claim 2, wherein:
the base element and front plate are injection molded in the ejector tool within which the base element and front plate remain,
the light conductor pins initially remain after said injection molding in a nozzle tool of the injection molding tool, and
the tool slide is arranged in the nozzle tool.

4. The method of claim 1, wherein:
said injection molding of light conductor pins is conducted in a first injection molding tool half with front pin faces oriented into the first tool half,
said injection and integral molding of the base plate and front plate respectively are also conducted in the first tool half,
the index plate is arranged in the first tool half, and
the tool slide is arranged in a second injection molding tool half.

5. The method of claim 1, wherein the injection molding tool comprises a reversal plate between first and second tool halves of the injection molding tool, the reversal plate being pivotable by 180° about an axis transverse to an axial direction of the injection molding tool, and the light conductor pins after injection molding remaining in the reversal plate and are brought into a position aligning with each respective dead hole channel on an open side of the reversal plate through pivoting of the reversal plate.

6. The method of claim 1, wherein said arranging is conducted by rotating the index plate by 180° about the axial direction.

7. The method of claim 1, wherein the tool slide axially moves mechanically hydraulically or pneumatically with respect to the injection molding tool.

8. The method of claim 1, wherein the light conductor pins are interlocked in a form-locking and/or friction locking manner with respective dead hole channels.

9. The method of claim 1, wherein the light conductor pins are inserted into respective dead hole channels so as to protrude beyond a front face of the base element.

10. The method of claim 1, wherein the light conductor pins are supported by the tool slide in respective dead hole channels during said integral molding of the front plate.

* * * * *